(12) United States Patent
Berliner et al.

(10) Patent No.: US 12,278,706 B2
(45) Date of Patent: Apr. 15, 2025

(54) TRANSPORT BLOCK GROUPING FOR HIGHER BANDS

(71) Applicant: QUALCOMM Incorporated, San Diego, CA (US)

(72) Inventors: Ran Berliner, Kfar-Aviv (IL); Shay Landis, Hod Hasharon (IL); Yehonatan Dallal, Kfar Saba (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 17/348,496

(22) Filed: Jun. 15, 2021

(65) Prior Publication Data

US 2022/0399959 A1     Dec. 15, 2022

(51) Int. Cl.
*H04L 1/1812* (2023.01)
*H04W 72/21* (2023.01)

(52) U.S. Cl.
CPC ........... *H04L 1/1812* (2013.01); *H04W 72/21* (2023.01)

(58) Field of Classification Search
CPC .............................. H04L 1/1812; H04W 72/21
See application file for complete search history.

(56) References Cited

U.S. PATENT DOCUMENTS

2008/0239962 A1* 10/2008 Kojima ................. H04L 47/824
370/235
2011/0243080 A1* 10/2011 Chen ................. H04W 74/0841
370/329
2018/0287752 A1  10/2018 Park et al.
2019/0159191 A1*  5/2019 Kim ....................... H04W 76/27
2019/0207734 A1*  7/2019 Yang ..................... H04L 1/0061
2021/0167899 A1*  6/2021 Balasubramanian ........................ H04B 7/18513
2021/0176011 A1   6/2021 Lei

OTHER PUBLICATIONS

CN-112154621-A, Balasubramanian A, English-Translation (Year: 2020).*
International Search Report and Written Opinion—PCT/US2022/033210—ISA/EPO—Oct. 5, 2022.

* cited by examiner

*Primary Examiner* — Jay P Patel
*Assistant Examiner* — Shehab A Alawdi
(74) *Attorney, Agent, or Firm* — Procopio, Cory, Hargreaves & Savitch LLP

(57) ABSTRACT

Aspects presented herein may enable a UE to provide HARQ feedback for multiple groups of CBs based on their associated CBG and TBG. In one aspect, a UE receives an RRC configuration for a HARQ transmission, the RRC configuration including a CBG configuration and a TBG configuration. The UE determines, based on the CBG configuration, a number of CBs for each of a plurality of CBGs for HARQ feedback. The UE determines, based on the TBG configuration, a number of TBs for each of a plurality of TBGs for the HARQ feedback. The UE transmits, to a base station, the HARQ feedback, where the HARQ feedback is based on the number of CBs for each of the plurality of CBGs and the number of TBs for each of the plurality of TBGs.

15 Claims, 15 Drawing Sheets

TRANSPORT BLOCK GROUPING FOR HIGHER BANDS

TECHNICAL FIELD

The present disclosure relates generally to communication systems, and more particularly, to wireless communication involving hybrid automatic repeat request (HARD) feedback.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a radio resource control (RRC) configuration for a hybrid automatic repeat request (HARQ) transmission, the RRC configuration including a code block group (CBG) configuration and a transport block group (TBG) configuration. The apparatus determines, based on the CBG configuration, a number of code blocks (CBs) for each of a plurality of CBGs for HARQ feedback. The apparatus determines, based on the TBG configuration, a number of transport blocks (TBs) for each of a plurality of TBGs for the HARQ feedback. The apparatus transmits, to a base station, the HARQ feedback, the HARQ feedback being based on the number of CBs for each of the plurality of CBGs and the number of TBs for each of the plurality of TBGs.

In an aspect of the disclosure, a method, a computer-readable medium, and an apparatus are provided. The apparatus transmits, to at least one user equipment (UE), an RRC configuration for a HARQ transmission, the RRC configuration including a CBG configuration and a TBG configuration. The apparatus receives, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
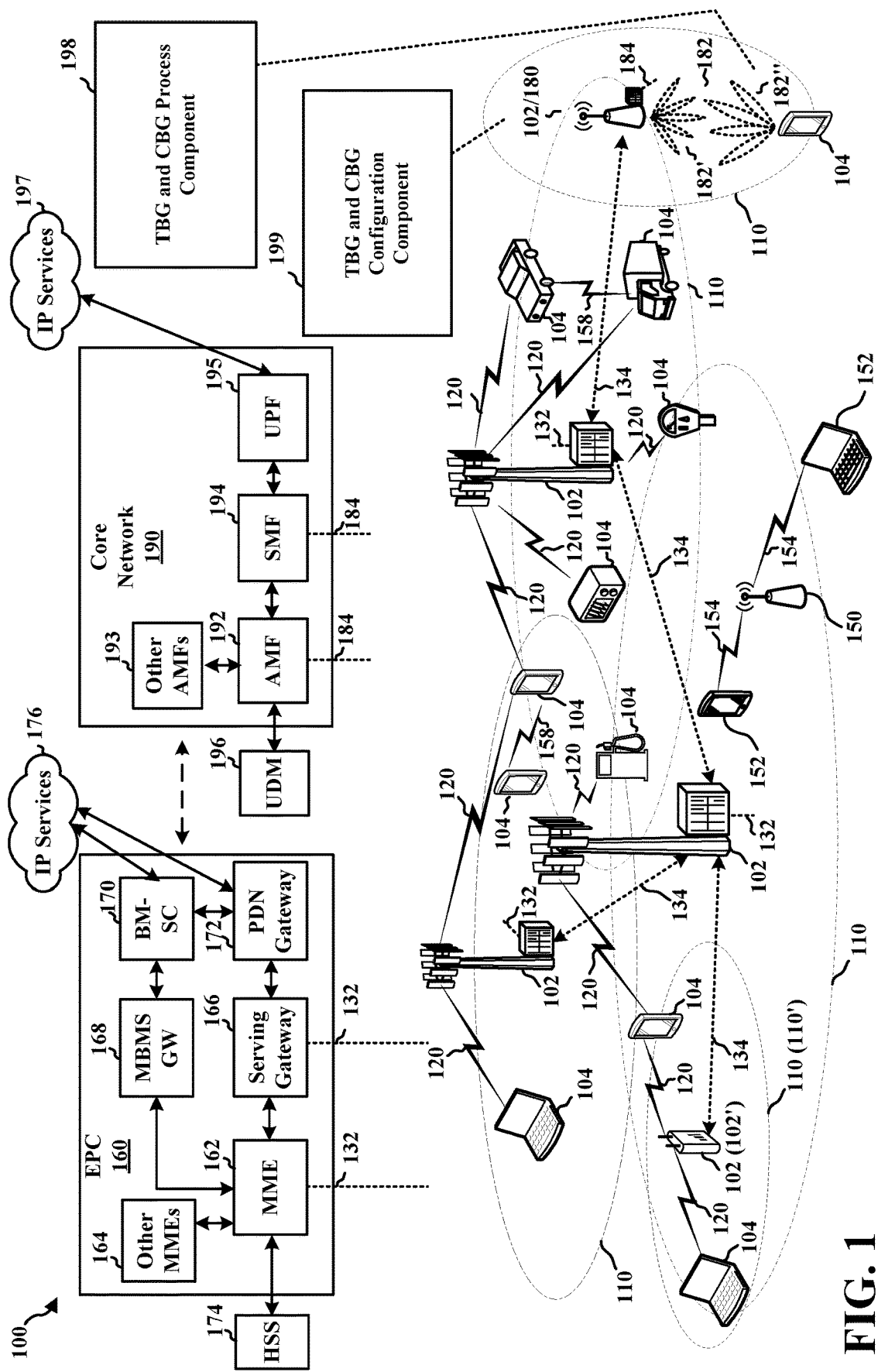
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may reduce HARQ feedback payload size to improve UCI reliability, such as HARQ feedback for transmissions involving multiple transport blocks (TBs). Aspects presented herein may enable UL resources configured for HARQ feedback to be reduced by enabling a receiving device to report HARQ feedback for groups of code blocks (CBs) based on their associated transport block groups (TBGs) and code block groups (CBGs).

In certain aspects, the UE 104 may include a TBG and CBG process component 198 configured to generate a positive feedback (e.g., an ACK) for a group of CBs that is associated with a CBG and a TBG if the UE correctly receives/decodes the group of CBs, and to generate a negative feedback (e.g., a NACK) if the UE incorrectly receives/decodes at least one CB in the group of CBs. In one configuration, the TBG and CBG process component 198 may be configured to receive an RRC configuration for a HARQ transmission, the RRC configuration including a CBG configuration and a TBG configuration. In such configuration, the TBG and CBG process component 198 may determine, based on the CBG configuration, a number of CBs for each of a plurality of CBGs for HARQ feedback. In such configuration, the TBG and CBG process component 198 may determine, based on the TBG configuration, a number of TBs for each of a plurality of TBGs for the HARQ feedback. In such configuration, the TBG and CBG process component 198 may transmit, to a base station, the HARQ feedback, the HARQ feedback being based on the number of CBs for each of the plurality of CBGs and the number of TBs for each of the plurality of TBGs.

In certain aspects, the base station 102/180 may include a TBG and CBG configuration component 199 configured to configure a UE to generate HARQ feedback for a group of CBs that is associated with a CBG and a TBG. In one configuration, the TBG and CBG configuration component 199 may be configured to transmit, to at least one UE, an RRC configuration for a HARQ transmission, the RRC configuration including a CBG configuration and a TBG configuration. In such configuration, the TBG and CBG configuration component 199 may receive, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
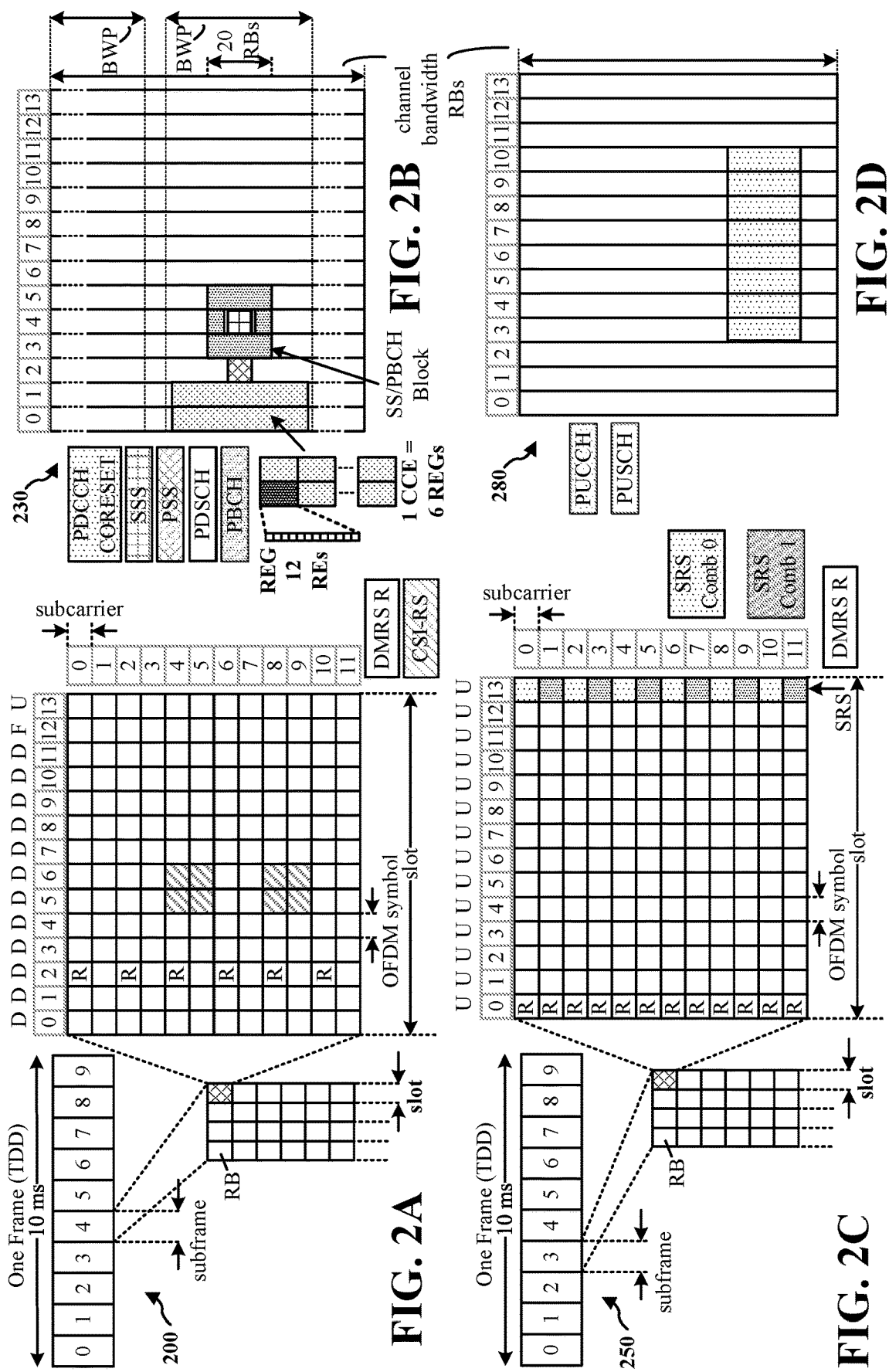
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | Scs<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
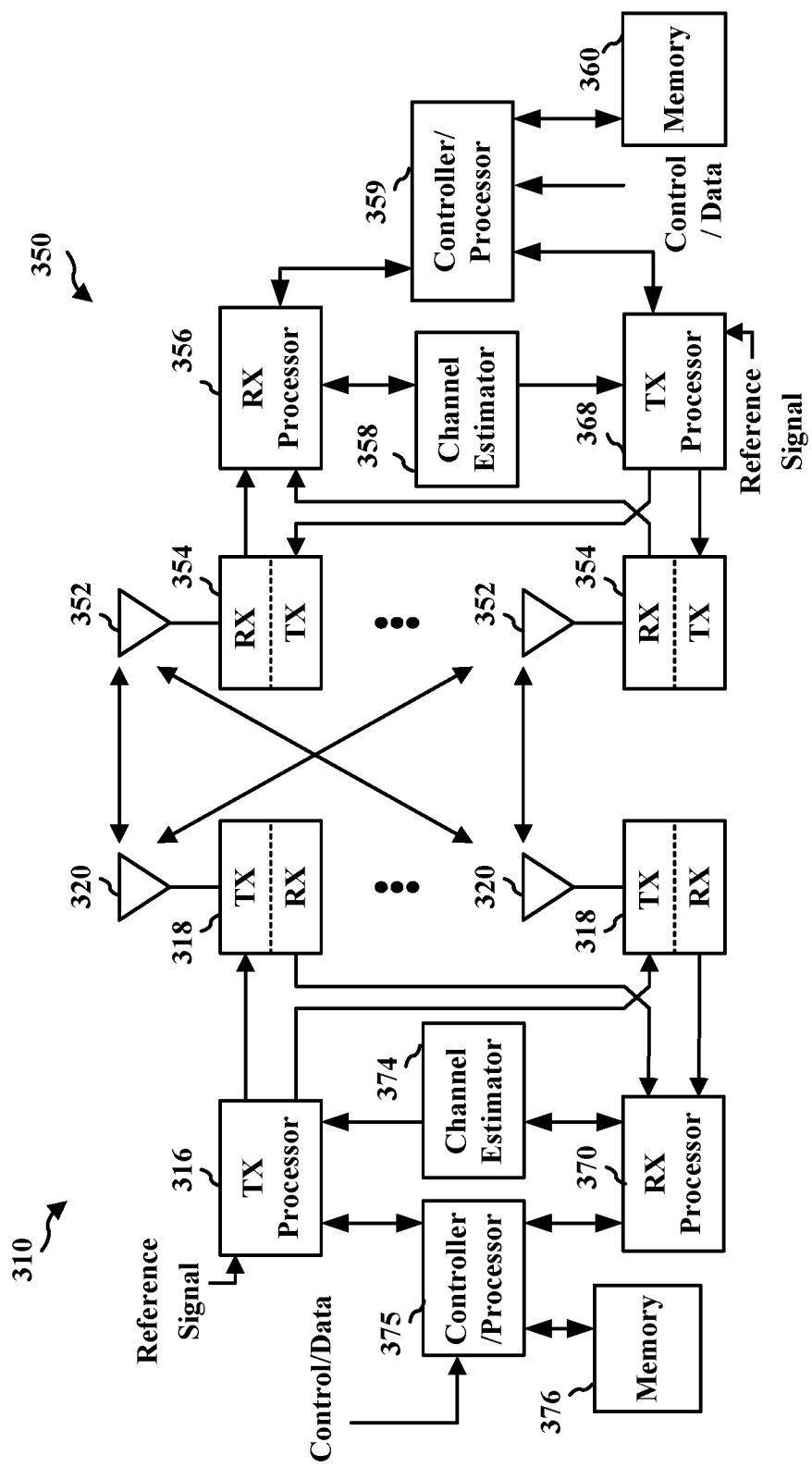
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TBG and CBG process component 198 of FIG. 1.

At least one of the TX processor 316, the RX processor 370, and the controller/processor 375 may be configured to perform aspects in connection with TBG and CBG configuration component 199 of FIG. 1.

As path loss for a transmission may increase as transmission frequency increases, a transmitting device (e.g., a base station, a UE, etc.) may use high-gain narrow-beam antennas or beamformed antenna arrays to mitigate the path loss. For example, a transmission under FR2 may be based on narrow directional analog beams (e.g., phased array), and at higher bands (e.g., FR4 and FR5), a transmission may utilize further narrower beams to overcome the additional path loss which may come from using higher frequency carriers. As the beams become narrower, the spatial separation between the beams may improve (e.g., less overlapping between the beams). For example, a beam/antenna module capable of generating narrow beams (e.g., a smart beam selection module/mechanism) may provide massive MIMO based on spatial division multiplexing (SDM) with much lower interference between the beams, compared with lower bands. In another example, sub-THz technologies, such as lens antennas, may enable a base station to transmit multiple beams (e.g., multiple data streams) from a same antenna panel. Thus, instead of configuring multiple TRPs on multiple different antenna panels, higher bands may enable multiple TRPs to be configured on a same antenna panel. However, as a number of transmissions from a transmitting device increases, a receiving device may receive multiple simultaneous data streams (e.g., a data stream per beam) that include a large number of simultaneously transport blocks (TBs).

A base station may configure a UE to transmit hybrid automatic repeat request (HARQ) feedback for a downlink transmission via a single uplink control information (UCI). However, as the number of received TBs increases, the UE may be configured to encapsulate multiple acknowledgement (ACK) indications and/or negative acknowledgement (NACK) indications for multiple TBs (and PDCCH semi-persistent scheduling (SPS) ACKs) which may coincide at a same time for the HARQ feedback transmission. As such, a HARQ feedback payload for higher bands (e.g., FR4, FR5, etc.) may further increase (e.g., compare to FR2). If the size of the HARQ-feedback payload increases (e.g., for higher bands), a UE may use more uplink (UL) resources and/or higher UL power (or using other methods, e.g., TB repetition) for maintaining UCI reliability.

Aspects presented herein may reduce HARQ feedback payload size to improve UCI reliability, such as HARQ feedback for transmissions involving multiple transport blocks (TBs). Aspects presented herein may enable UL resources configured for HARQ feedback to be reduced by enabling a receiving device to report HARQ feedback for a group of code blocks (CBs) based on transport block groups (TBGs) and code block groups (CBGs).

In one example, when a transmitting device is transmitting a TB that may be large in size to a receiving device, the transmitting device may segment the TB into multiple CBs. Then, the receiving device, such as a UE, may be configured to provide separate HARQ feedback for different groups of CBs (e.g., for different CBGs).

Figure 4:
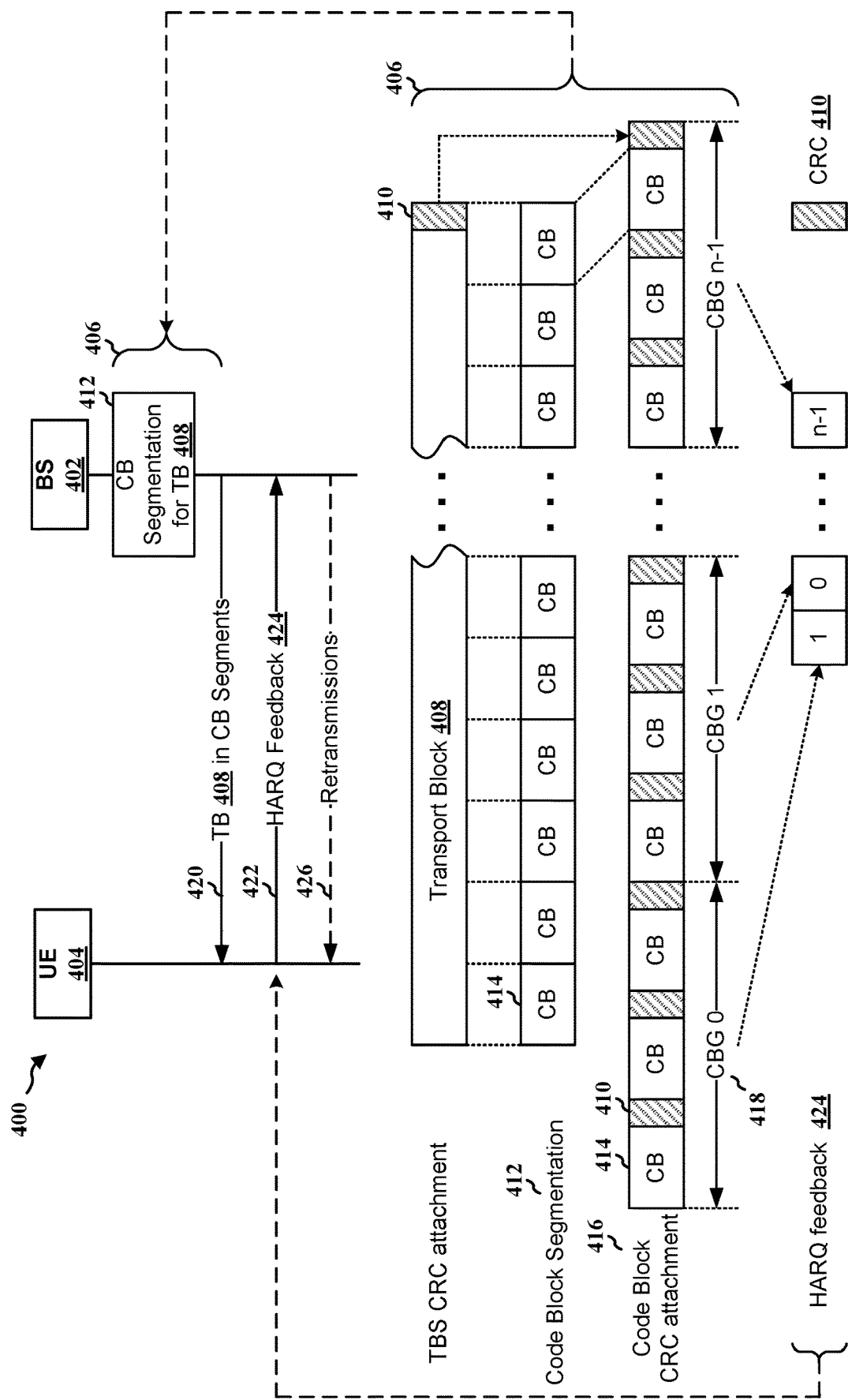
FIG. 4 is a diagram illustrating an example of code block segmentation and hybrid automatic repeat request (HARQ) feedback for segmented code blocks in accordance with various aspects of the present disclosure.

FIG. 4 is a diagram 400 illustrating an example of code block segmentation and HARQ feedback for segmented code blocks. As shown at 406, a base station 402 may be configured to transmit a TB 408 that is associated with a cyclic redundancy check (CRC) 410 to a UE 404. Prior to the transmission, as shown at 412, the base station 402 may segment the TB 408 into a plurality of CBs 414. Then, as shown at 416, the base station 402 may attach the CRC 410 to each of the CBs 414.

As shown at 418, after the TB 408 is segmented into multiple CBs 414, the base station 402 may assign one or more CBs 414 to a CBG. For example, the base station 402 may assign three (3) CBs to a CBG, such that the first three CBs segmented from the TB 408 may belong to a first CBG (e.g., CBG #0), the next three CBs segmented from the TB 408 may belong to a second CBG (e.g., CBG #1), and the last one to three CBs may belong to a $(n-1)^{th}$ CBG (e.g., CBG #n-1), etc. In some examples, the base station 402 may transmit a CBG configuration to the UE 404, such as via a radio resource control (RRC) configuration or downlink control information (DCI), where the CBG configuration may indicate the number of CBs for each CBG. As such, the UE 404 may be aware of the corresponding CBGs that are associated with the CBs 414 segmented from the TB 408.

As shown at 420, after the CB segmentation, the base station 402 may transmit the TB 408 in CB segments (e.g., in CBs 414) to the UE 404. Prior to the transmission, the base station 402 may also request or configure the UE 404 to provide HARQ feedback for the CBs 414 based on CBGs.

In response, as shown at 422, based on the decoding status of the received CBs 414, the UE 404 may transmit HARQ feedback 424 to the base station 402 based on CBGs. In one example, the HARQ feedback 424 may indicate whether all CBs in a CBG have been successfully decoded and/or whether at least one CB in a CBG has not been successfully decoded. For example, as shown by a diagram 500 in FIG. 5, each CBG 502 may include three CBs 504. If a UE (e.g., the UE 404) is able to decode the three CBs 504 in a first CBG 508 (e.g., CBG #0), the UE may indicate an ACK (e.g., HARQ feedback bit=1) for the first CBG 508 in a HARQ feedback 506 (e.g., the HARQ feedback 424). On the other hand, if the UE is unable to decode at least a CB within a CBG, such as shown for a second CBG 510 (e.g., CBG #1), the UE may indicate a NACK (e.g., HARQ feedback bit=0) for the second CBG 510 in the HARQ feedback 506. In other words, for enhancing the ACK/NACK feedback to be of CB resolution, while conveying a large number of code blocks with reasonable HARQ feedback payload size, multiple code blocks ACK/NACK indications may be grouped into a single bit to forming a CBG. Thus, a UE may generate an ACK per bit of a CBG if the UE correctly receives all code blocks of the CBG, and the UE may generate a NACK bit of a CBG if the UE incorrectly receives at least one code block of the CBG, etc.

Referring back to FIG. 4, as shown at 426, based on the received HARQ feedback 424, the base station 402 may retransmit CBs of CBG(s) that have been indicated by the UE 404 with NACK(s) in the HARQ feedback 424 accordingly. As such, instead of providing a separate HARQ feedback indication for each of the CBs 414 segmented from the TB 408, the UE 404 may be able to provide a HARQ feedback indication for CBs in groups (e.g., in CBGs), which may reduce HARQ feedback 424's payload size and improve the reliability of UCI. Note while the example in FIG. 4 shows the code block segmentation and HARQ feedback apply to a downlink transmission (e.g., from the base station 402 to the UE 404), similar code block segmentation and HARQ feedback mechanisms may also apply to an uplink transmission (e.g., from a UE to a base station) and/or a transmission between UEs (e.g., a sidelink transmission).

In one aspect of the present disclosure, when a transmitting device is transmitting multiple TBs (e.g., via multiple beams of a same antenna panel) to a receiving device, the transmitting device may segment each of the multiple TBs into multiple CBs. Then, the transmitting device may associate one or more CBs with a CBG (e.g., within each TB), such as described in connection with FIG. 4. In addition, the transmitting device may further associate one or more TBs with a transport block group (TBG), such that a receiving device may provide HARQ feedback based on CBG and TBG. In other words, the transmitting device may use TBG along with CBG (e.g., to form a two-dimensional CBG) for TBs received on a same transmission time interval (TTI).

Figure 6:
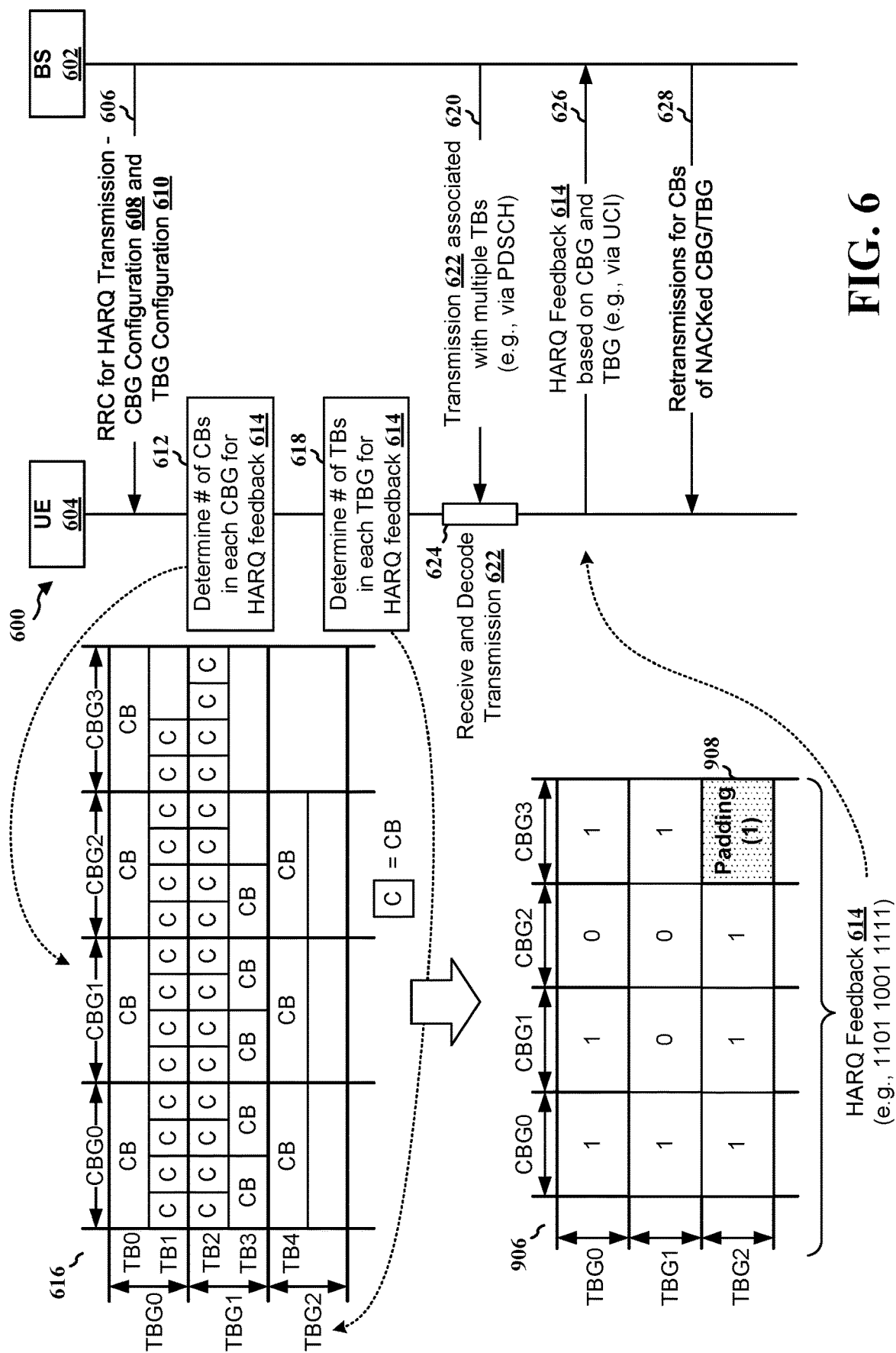
FIG. 6 is a communication flow illustrating an example of a receiving device providing HARQ feedback for groups of code blocks (CBs) based on their associated CBG and transport block group (TBG) in accordance with various aspects of the present disclosure.

FIG. 6 is a communication flow 600 illustrating an example of a receiving device, such as a UE, providing HARQ feedback for groups of CBs based on their associated CBG and TBG according to various aspects of the present disclosure. Aspects presented herein may enable a base station to indicate a number of TBGs for TBs transmitted in a TTI, such as via an RRC parameter (e.g., maxTramsportBlockGroupsPerTTI).

At 606, a base station 602 may transmit, to a UE 604, an RRC configuration for HARQ transmission, where the RRC configuration may include a CBG configuration 608 and a TBG configuration 610. In some examples, the CBG configuration 608 and/or the TBG configuration 610 may be pre-defined at the UE 604, and the base station 602 may skip transmitting the CBG configuration 608 and/or the TBG configuration 610 to the UE 604. In other examples, the base station 602 may also indicate the CBG configuration 608 and/or the TBG configuration 610 to the UE 604 via DCI. The RRC configuration may indicate to the UE 604 to provide HARQ feedback for one or more transmissions that are associated with multiple TBs.

Figure 5:
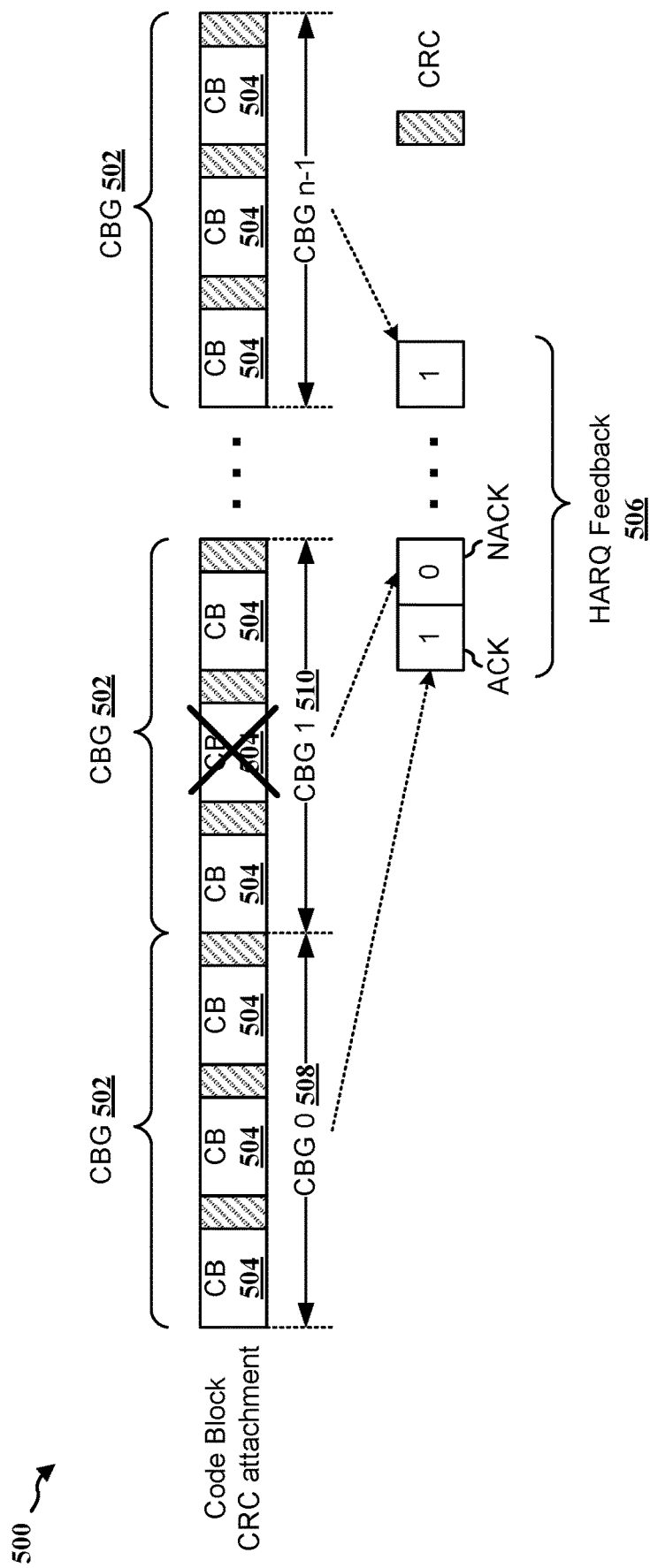
FIG. 5 is a diagram illustrating an example of a HARQ feedback based on code block group (CBG) in accordance with various aspects of the present disclosure.

At 612, based at least in part on the CBG configuration 608 (e.g., pre-defined at the UE 604 or received from the base station 602, etc.), the UE 604 may determine a number of CBs for each of a plurality of CBGs for HARQ feedback 614, such as described in connection with FIGS. 4 and 5. In one example, the number of CBs for each of a plurality of CBGs may be configured to be different for different TBs. For example, as shown at 616, the CBG configuration 608 may indicate that a CBG for a first TB (e.g., TB0) may include (up to) one (1) CB (e.g., one CB per CBG), a CBG for a second TB (e.g., TB1) may include (up to) four (4) CBs (e.g., four CBs per CBG), a CBG for a third TB (e.g., TB2) may include (up to) four CBs (e.g., four CBs per CBG), a CBG for a fourth TB (e.g., TB3) may include (up to) two (2) CBs (e.g., two CBs per CBG), and a CBG for a fifth TB (e.g., TB4) may include (up to) one CB (e.g., one CB per CBG), etc. In another example, the number of CBs for each of a plurality of CBGs may be configured to be the same for different TBs. For example, the CBG configuration 608 may indicate that a CBG for one or more TBs (e.g., TB0 to TB3) may include (up to) four (4) CBs.

At 618, based at least in part on the TBG configuration 610 (e.g., pre-defined at the UE 604 or received from the base station 602, etc.), the UE 604 may determine a number of TBs for each of a plurality of TBGs for the HARQ feedback 614. For example, as shown at 616, the TBG configuration 610 may indicate that each TBG may include (up to) two (2) TBs.

Figure 7:
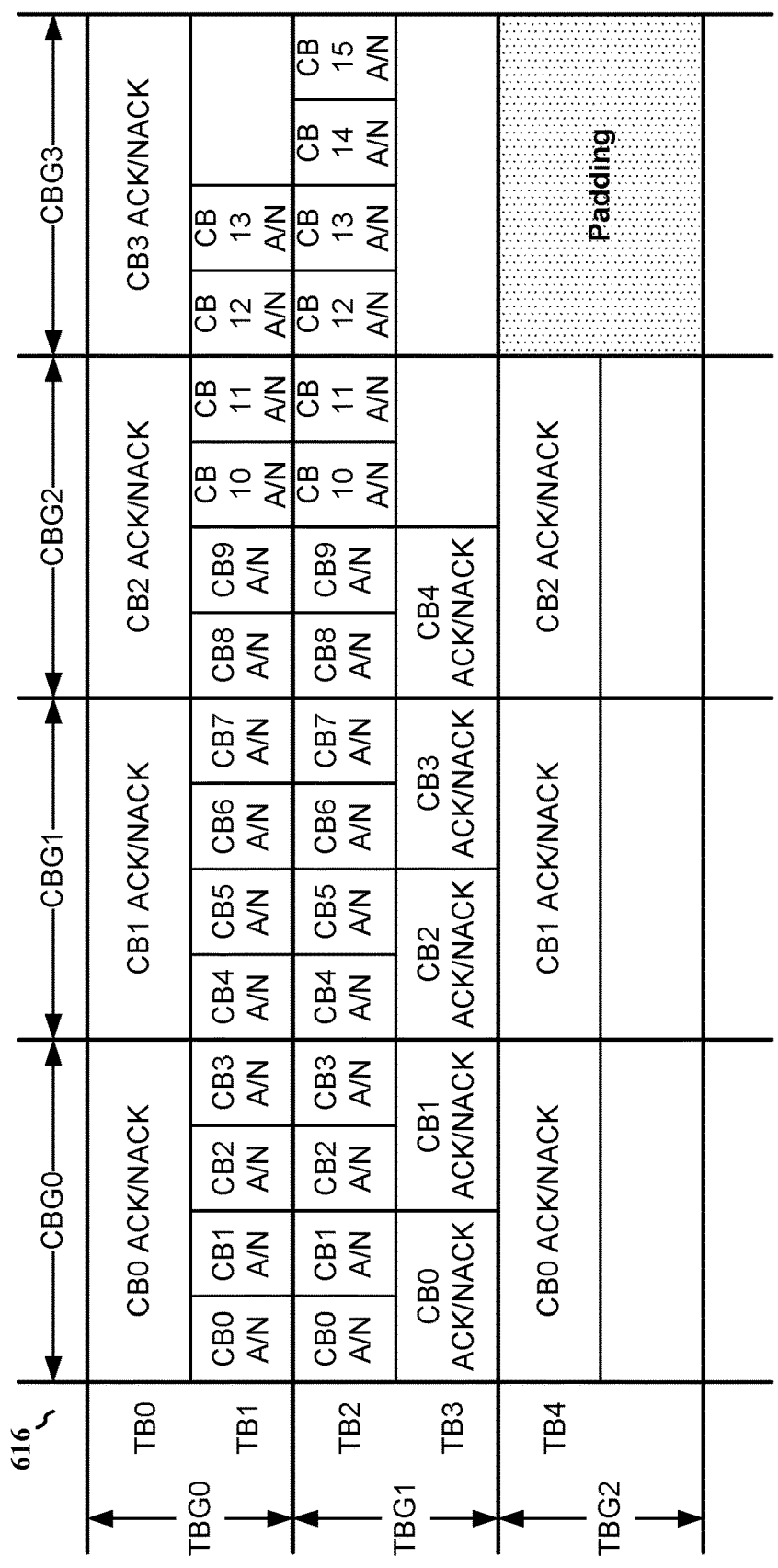
FIG. 7 is a diagram illustrating an example of a HARQ feedback based on CBG and TBG in accordance with various aspects of the present disclosure.

At 620, the base station 602 may transmit a data transmission 622 (e.g., a PDSCH) to the UE 604, where the data transmission 622 may include multiple TBs. Prior to the transmission, as discussed in connection with FIG. 4, the base station 602 may segment each of the multiple TBs into a plurality of CBs, such as based on the CBG configuration 608. For example, as shown at 616 of FIG. 6 and diagram 700 of FIG. 7, the base station 602 may segment the first TB (e.g., TB0) to fourteen (4) CBs (e.g., CB0 to CB3), segment the second TB (e.g., TB1) to fourteen (14) CBs (e.g., CB0 to CB13), segment the third TB (e.g., TB2) to sixteen (16) CBs (e.g., CB0 to CB15), segment the fourth TB (e.g., TB3) to five (5) CBs (e.g., CB0 to CB4), and segment the fifth TB (e.g., TB4) to three (3) CBs (e.g., CB0 to CB2), etc. Then, the base station 602 may attach a CRC to each of the segmented CBs. After the CB segmentation, the base station 602 may transmit the TBs of the data transmission 622 in CB segments to the UE 604.

Figure 8:
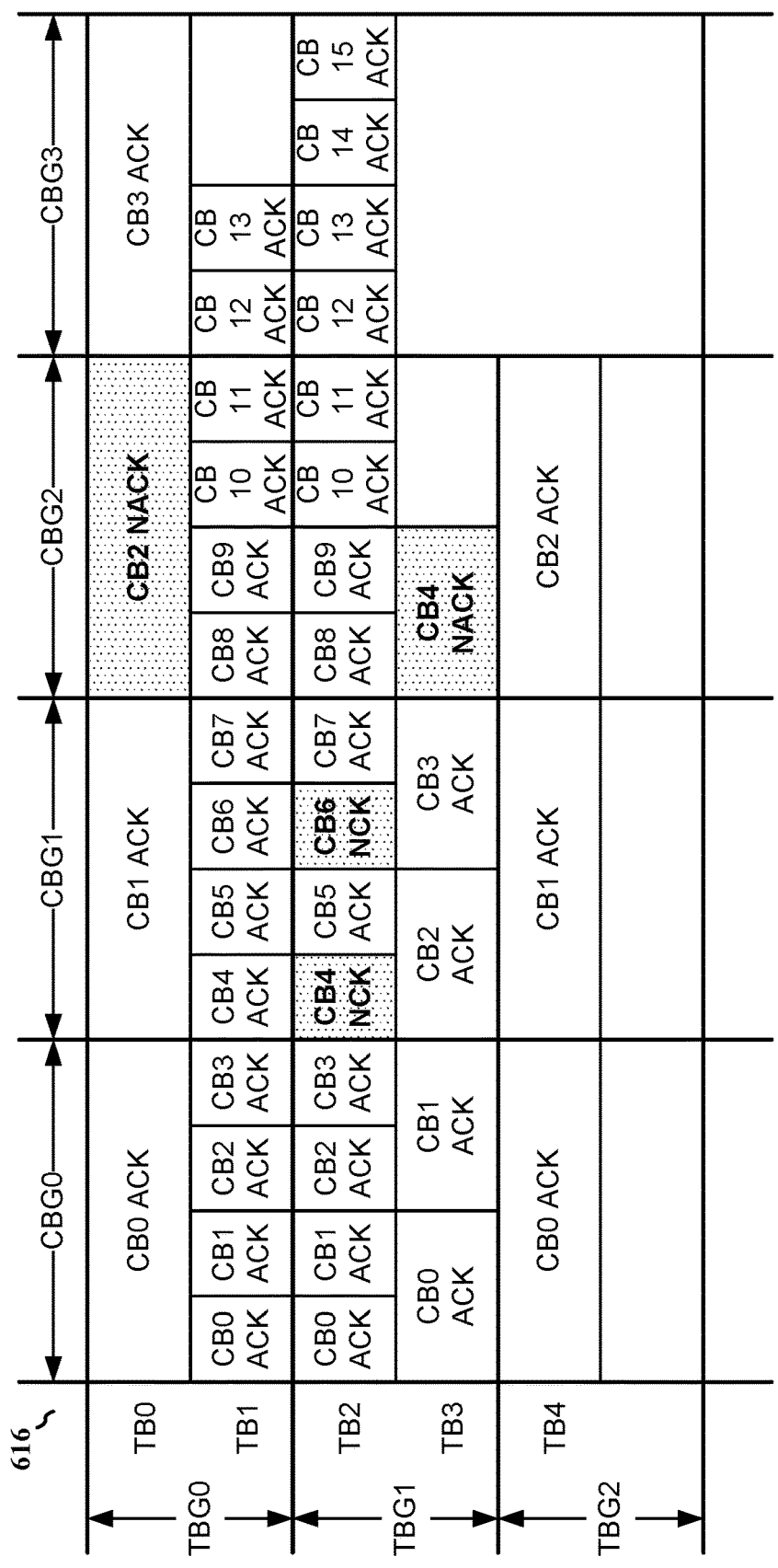
FIG. 8 is a diagram illustrating an example of a HARQ feedback based on CBG and TBG in accordance with various aspects of the present disclosure.

At 624, the UE 604 may receive and decode the CBs within the data transmission 622 transmitted from the base station 602, such as described in connection with FIG. 4. Then, based on the decoding status (e.g., decoding successful or unsuccessful) for the CBs within the data transmission 622, at 626, the UE 604 may transmit the HARQ feedback 614 to the base station 602, where the HARQ feedback 614 may be based on a CBG and a TBG. In one example, the HARQ feedback 614 may indicate whether all CBs associated with a CBG and a TBG have been successfully decoded and/or whether at least one CB associated with a CBG and a TBG has not been successfully decoded, etc. For example, as shown by diagram 800 of FIG. 8, the UE 604 may successfully receive and decode all CBs within the first TB (e.g., TB0) except for the third CB (e.g., CB2), successfully receive and decode all CBs within the second TB (e.g., TB1), successfully receive and decode all CBs within the third TB (e.g., TB2) except for the fifth CB (e.g., CB4) and the seventh CB (e.g., CB6), and successfully receive and decode all CBs within the fifth TB (e.g., TB4), etc.

Figure 9:
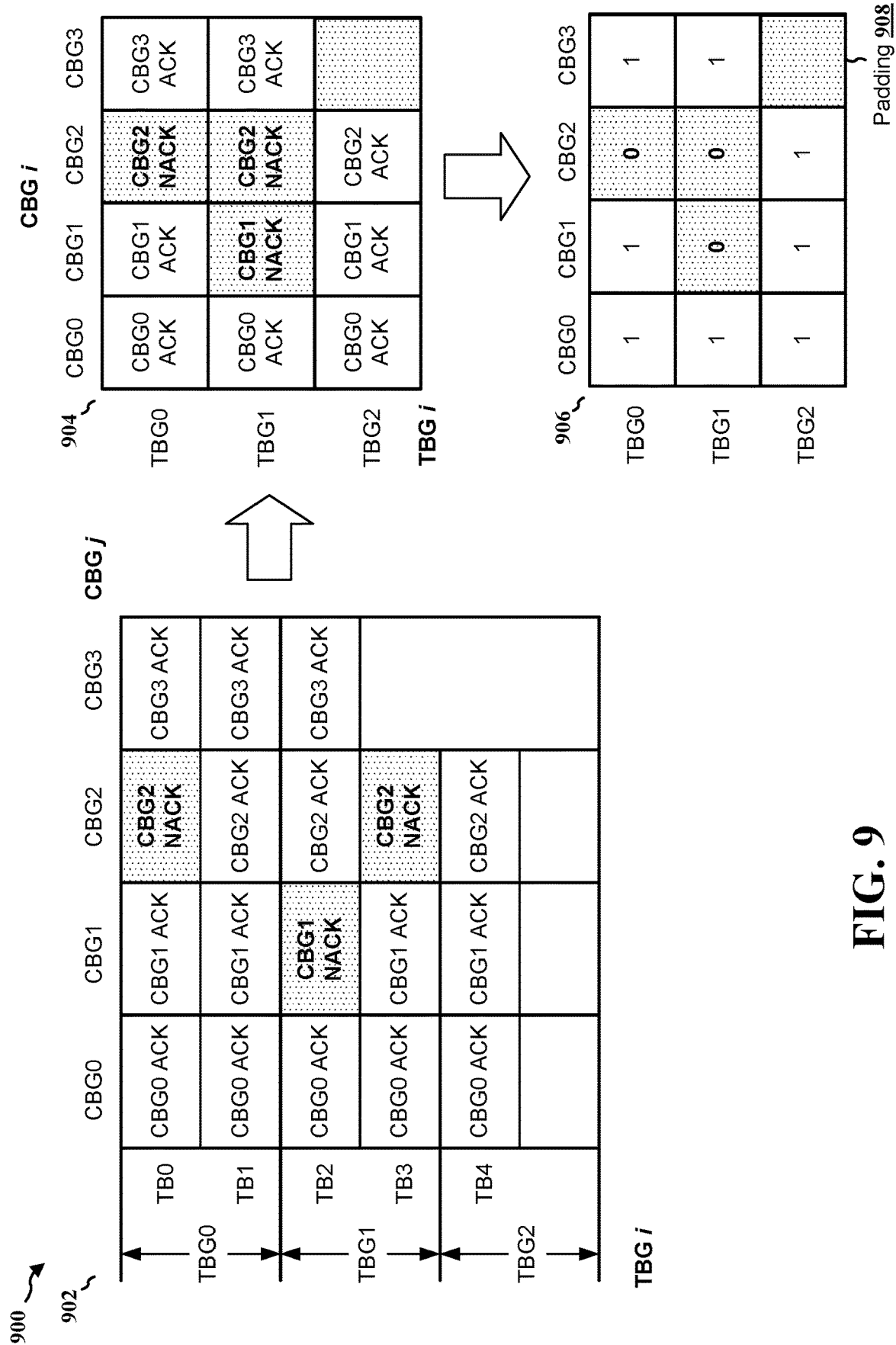
FIG. 9 is a diagram illustrating an example of a HARQ feedback based on CBG and TBG in accordance with various aspects of the present disclosure.

In one example, as shown by diagram 900 of FIG. 9, the UE 604 may generate the HARQ feedback 614 based on a two-dimensional (e.g., horizontal and vertical) CBG/TBG ACK/NACK index. For example, the UE 604 may first determine decoding result for CBs within each CBG (e.g., horizontal, CB grouping) for each of the multiple TBs associated with the data transmission 622. As shown at 902, as the UE 604 is unable to decode the third CB (e.g., CB2) within the first TB (e.g., TB0), the UE 604 may indicate a NACK for the third CBG (e.g., CBG2) in the first TB. As the UE 604 is unable to decode the fifth CB (e.g., CB4) and the seventh CB (e.g., CB6) within the third TB (e.g., TB2), the UE 604 may indicate a NACK for the second CBG (e.g., CBG1) in the third TB. Similarly, as the UE 604 is unable to decode the fifth CB (e.g., CB4) within the fourth TB (e.g., TB3), the UE 604 may indicate a NACK for the third CBG (e.g., CBG2) in the fourth TB, etc. In other words, per TTI, the UE 604 may group CBs according to CBG settings (e.g., the CBG configuration 608) per received TB (e.g., $TB_i$). In one example, a TB index may be configured according to a {CC, TRP} pair in an ascending order. Thus, the UE 604 may create a two-dimensional $TBG/CBG_{i,j}$ ACK/NACK bits matrix (e.g., see 902 of FIG. 9), where i may be the TB index (e.g., TB0 to TB4) and j may be the CBG index (e.g., CGB0 to CGB3).

Then, as shown at 904 of FIG. 9, the UE 604 may determine the decoding result for CBGs in each TBG (e.g., vertical, TB grouping). For example, as the UE 604 successfully decodes all CBs that are associated with first CBG (e.g., CBG0) and the first TBG (e.g., TBG0 that includes the first TB and the second TB), the UE 604 may indicate an ACK for $TBG/CBG_{0,0}$. As the UE 604 successfully decodes all CBs that are associated with a fourth CBG (e.g., CBG3) and the second TBG (e.g., TBG1 that includes the third TB and the fourth TB), the UE 604 may indicate an ACK for $TBG/CBG_{1,3}$, etc. On the other hand, as the UE 604 is unable to decode at least one CB within the third CBG (e.g., CBG2) of the first TB (e.g., TB0 of the first TBG), the UE 604 may indicate a NACK for $TBG/CBG_{0,2}$. Similarly, as the UE 604 is unable to decode at least one CB within the second CBG (e.g., CBG1) of the third TB (e.g., TB2 of the second TBG (TGB1)) and at least one CB within the third CBG (e.g., CBG2) of the fourth TB (e.g., TB3 of the second TBG (TBG1)), the UE 604 may indicate a NACK for $TBG/CBG_{1,1}$ and $TBG/CBG_{1,2}$, respectively.

As such, based on the decoding status of the received CBs associated with the data transmission 622, the UE 604 may transmit the HARQ feedback 614 to the base station 602 based on CBGs and TBGs. In other words, the HARQ feedback 624 may indicate whether all CBs associated with a CBG and a TBG have been successfully decoded and/or whether at least one CB associated with a CBG and a TBG has not been successfully decoded. If the UE 604 is able to decode the CBs associated with a CBG and a TBG, the UE 604 may indicate an ACK (e.g., HARQ feedback bit=1) for the TBG/CBG group. However, if the UE 604 is unable to decode at least one CB in an associated CBG/TBG group, the UE 604 may indicate a NACK (e.g., HARQ feedback bit=0) for the TBG/CBG group, such as shown at 906 of FIG. 9. By providing the HARQ feedback 614 based on a CBG and a TBG, the base station 602 may convey a large number of TBs with a configurable (e.g., reduced) payload size, where multiple CBs ACK/NACK indications may be grouped into a single bit to forming a CBG/TBG group feedback. Thus, the payload size of the HARQ feedback 614 may be reduced, which may also improve the reliability of UCI carrying the HARQ feedback 614.

In some examples, to make the HARQ feedback 614 have a uniform size, one or more paddings may be added to the HARQ feedback 614, such that each TBG may be associated with a same number of HARQ feedback bits. For example, as shown at 906 of FIG. 9, each of the first TBG (e.g., TBG0) and the second TBG (e.g., TBG1) may be associated with four CBGs (e.g., CBG0 to CBG3) while the third TBG (e.g., TBG2) may be associated with three CBGs (e.g., CBG0 to CBG2). As such, the UE 604 may allocate four (4) feedback bits for each of the first TBG (e.g., TBG0) and the second TBG (e.g., TBG1), and may allocate three (3) feedback bits for the third TBG (e.g., TBG2). However, this may make HARQ feedback size different for different number of CBGs.

As such, in some examples, the UE 604 may be configured to add one or more paddings (e.g., zero/one paddings) to the HARQ feedback 614 when a CBG/TBG group does not include any ACK/NACK feedback (e.g., does not include at least a CB). For example, as shown at 906, the UE 604 may include a padding 908 for the $TBG/CBG_{2,3}$ group (which may be zero (0) or one (1) depending on the configuration). Thus, each TBG (e.g., TBG0 to TBG2) may have an equal number of feedback bits. Then, a maximum number of bits for the HARQ feedback 614 in the UCI may correspond to the number of CBGs multiplied by the number of TBGs. For example, as shown at 906, as there are four CBGs and three TBGs, the maximum number of bits for the HARQ feedback 614 in the UCI may be twelve (12) bits.

Referring back to FIG. 6, as shown at 628, based on the received HARQ feedback 614, the base station 602 may retransmit CBs of a TBG/CBG group (e.g., $TBG/CBG_0$) that has been indicated by the UE 604 with a NACK in the HARQ feedback 624 accordingly. For example, as the UE 604 indicates a NACK (e.g., HARQ feedback bit=0) for $TBG/CBG_{0,2}$, $TBG/CBG_{1,1}$, and $TBG/CBG_{1,2}$, the base station 602 may retransmit CBs associated with $TBG/CBG_{0,2}$, $TBG/CBG_{1,1}$, and $TBG/CBG_{1,2}$ to the UE 604. Note while aspects discussed in connection with FIGS. 6 to 9 show TBG/CBG grouping and HARQ feedback apply to a downlink transmission (e.g., from the base station 602 to the UE 604), similar TBG/CBG grouping and HARQ feedback mechanism may also apply to an uplink transmission (e.g., from a UE to a base station) and/or a transmission between UEs (e.g., a sidelink transmission).

Figure 10:
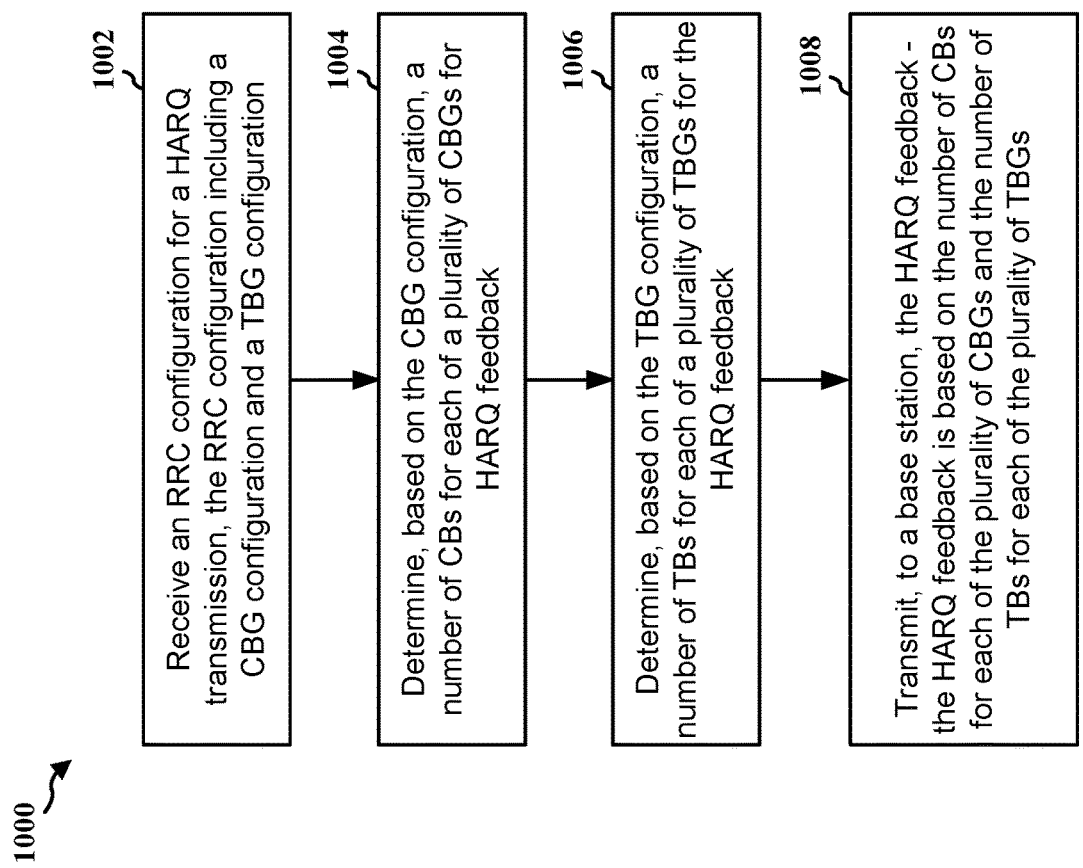
FIG. 10 is a flowchart of a method of wireless communication in accordance with aspects presented herein.

FIG. 10 is a flowchart 1000 of a method of wireless communication. The method may be performed by a UE or a component of a UE (e.g., the UE 104, 350, 604; the apparatus 1102; a processing system, which may include the memory 360 and which may be the entire UE 350 or a component of the UE 350, such as the TX processor 368, the RX processor 356, and/or the controller/processor 359). The method may enable the UE to provide HARQ feedback for multiple groups of CBs based on their associated CBG and the TBG.

At 1002, the UE may receive an RRC configuration for a HARQ transmission, the RRC configuration including a CBG configuration and a TBG configuration, such as described in connection with FIG. 6. For example, at 606, the UE 604 may receive, from the base station 602, an RRC configuration for a HARQ transmission, where the RRC configuration includes a CBG configuration 608 and a TBG configuration 610. The reception of the RRC configuration may be performed by, e.g., the RRC process component 1240 and/or the reception component 1230 of the apparatus 1202 in FIG. 12.

The RRC configuration may be preconfigured or received from the base station. In some examples, the RRC configuration may include at least one parameter for a maximum number of TBGs per TTI.

At 1004, the UE may determine, based on the CBG configuration, a number of CBs for each of a plurality of CBGs for HARQ feedback, such as described in connection with FIG. 6. For example, at 612, the UE 604 may determine, based on the CBG configuration 608, a number of CBs for each of a plurality of CBGs for HARQ feedback 614. The determination of CBG may be performed by, e.g., the CBG determination component 1242 of the apparatus 1202 in FIG. 12.

At 1006, the UE may determine, based on the TBG configuration, a number of TBs for each of a plurality of TBGs for the HARQ feedback, such as described in connection with FIG. 6. For example, at 618, the UE 604 may determine, based on the TBG configuration 610, a number of TBs for each of a plurality of TBGs for the HARQ feedback 614. The determination of TBG may be performed by, e.g., the TBG determination component 1244 of the apparatus 1202 in FIG. 12.

At 1008, the UE may transmit, to a base station, the HARQ feedback, the HARQ feedback being based on the number of CBs for each of the plurality of CBGs and the number of TBs for each of the plurality of TBGs, such as described in connection with FIG. 6. For example, at 626, the UE 604 may transmit, to the base station 602, the HARQ feedback 614, where the HARQ feedback 614 may be based on the number of CBs for each of the plurality of CBGs and the number of TBs for each of the plurality of TBGs. The transmission of the HARQ feedback may be performed by, e.g., the HARQ feedback generation component 1246 and/or the transmission component 1234 of the apparatus 1202 in FIG. 12.

For example, the UE may receive, from the base station, a transmission including a plurality of TBs in a TTI, where each of the plurality of TBs may include a plurality of CBs. In such an example, the UE may group the plurality of CBs into one or more CBGs based on the determined number of CBs for each of the plurality of CBGs, and the UE may group the plurality of TBs into one or more TBGs based on the determined number of TBs for each of the plurality of TBGs. In such an example, the UE may associate each of the one or more CBGs with each of the one or more TBGs with at least one HARQ feedback bit in the HARQ feedback. As such, the UE may indicate an ACK for the at least one HARQ feedback bit if the UE successfully decodes CBs in a corresponding CBG and a corresponding TBG, and the UE may indicate a NACK for the at least one HARQ feedback bit if the UE does not decode at least one CB in a corresponding CBG and a corresponding TBG. If the UE indicate a NACK for the at least one HARQ feedback bit, the UE may receive, from the base station, a retransmission for CBs in the corresponding CBG and the corresponding TBG.

In another example, the HARQ feedback may be transmitted via UCI. In such an example, a maximum number of bits for the HARQ feedback in the UCI may correspond to the number of CBGs multiplied by the number of TBGs.

Figure 11:
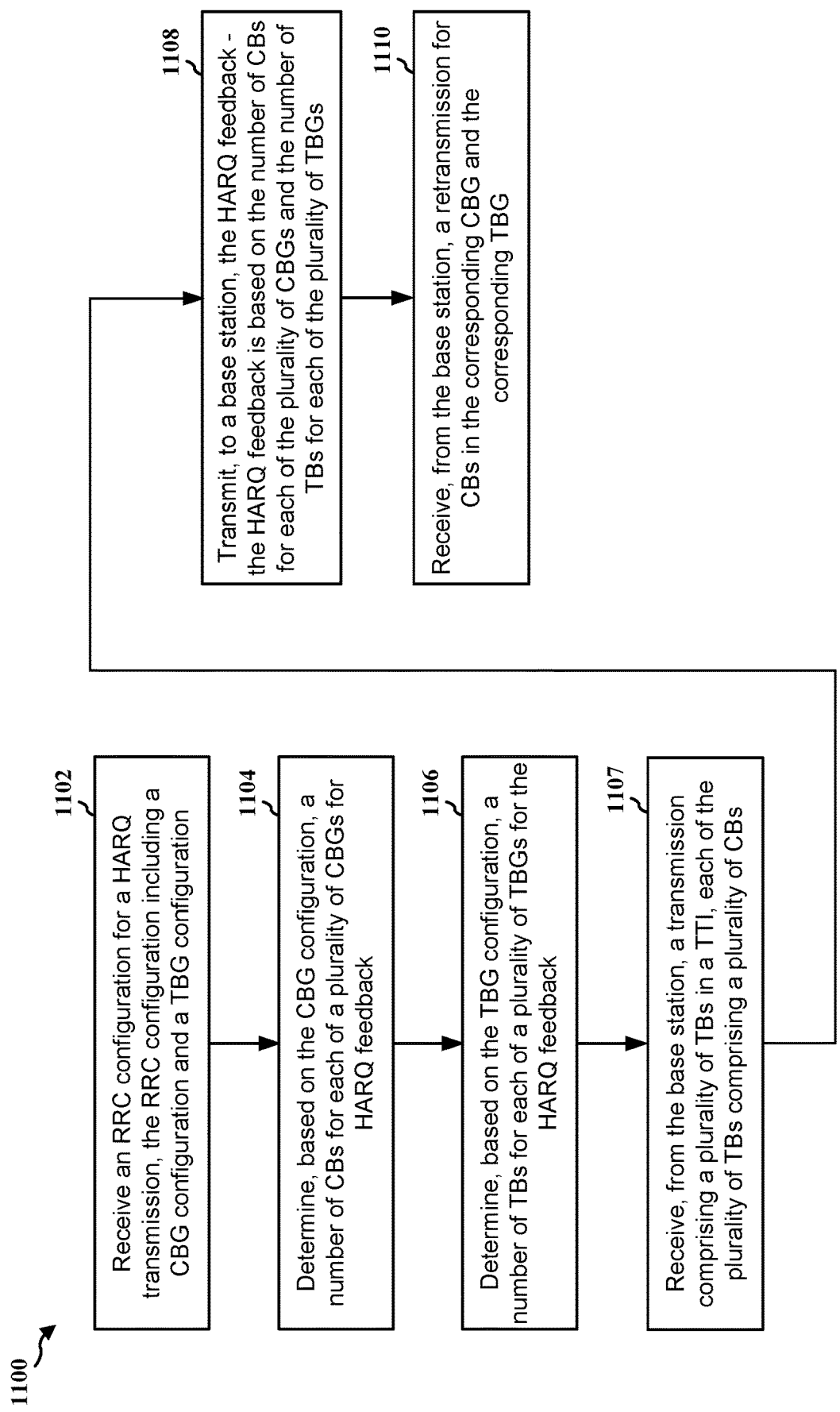
FIG. 11 is a flowchart of a method of wireless communication in accordance with aspects presented herein.

FIG. 11 is a flowchart 1100 of a method of wireless communication. The method may be performed by a UE or a component of a UE (e.g., the UE 104, 350, 604; the apparatus 1102; a processing system, which may include the memory 360 and which may be the entire UE 350 or a component of the UE 350, such as the TX processor 368, the RX processor 356, and/or the controller/processor 359). The method may enable the UE to provide HARQ feedback for multiple groups of CBs based on their associated CBG and the TBG.

At 1102, the UE may receive an RRC configuration for a HARQ transmission, the RRC configuration including a CBG configuration and a TBG configuration, such as described in connection with FIG. 6. For example, at 606, the UE 604 may receive, from the base station 602, an RRC configuration for a HARQ transmission, where the RRC configuration includes a CBG configuration 608 and a TBG configuration 610. The reception of the RRC configuration may be performed by, e.g., the RRC process component 1240 and/or the reception component 1230 of the apparatus 1202 in FIG. 12.

The RRC configuration may be preconfigured or received from the base station. In some examples, the RRC configuration may include at least one parameter for a maximum number of TBGs per TTI.

At 1104, the UE may determine, based on the CBG configuration, a number of CBs for each of a plurality of CBGs for HARQ feedback, such as described in connection with FIG. 6. For example, at 612, the UE 604 may determine, based on the CBG configuration 608, a number of CBs for each of a plurality of CBGs for HARQ feedback 614. The determination of CBG may be performed by, e.g., the CBG determination component 1242 of the apparatus 1202 in FIG. 12.

At 1106, the UE may determine, based on the TBG configuration, a number of TBs for each of a plurality of TBGs for the HARQ feedback, such as described in connection with FIG. 6. For example, at 618, the UE 604 may determine, based on the TBG configuration 610, a number of TBs for each of a plurality of TBGs for the HARQ feedback 614. The determination of TBG may be performed by, e.g., the TBG determination component 1244 of the apparatus 1202 in FIG. 12.

At 1108, the UE may transmit, to a base station, the HARQ feedback, the HARQ feedback being based on the number of CBs for each of the plurality of CBGs and the number of TBs for each of the plurality of TBGs, such as described in connection with FIG. 6. For example, at 626, the UE 604 may transmit, to the base station 602, the HARQ feedback 614, where the HARQ feedback 614 may be based on the number of CBs for each of the plurality of CBGs and the number of TBs for each of the plurality of TBGs. The transmission of the HARQ feedback may be performed by, e.g., the HARQ feedback generation component 1246 and/or the transmission component 1234 of the apparatus 1202 in FIG. 12.

In one example, as shown at 1107, the UE may receive, from the base station, a transmission including a plurality of TBs in a TTI, where each of the plurality of TBs may include a plurality of CBs. In such an example, the UE may group the plurality of CBs into one or more CBGs based on the determined number of CBs for each of the plurality of CBGs, and the UE may group the plurality of TBs into one or more TBGs based on the determined number of TBs for each of the plurality of TBGs. In such an example, the UE may associate each of the one or more CBGs with each of the one or more TBGs with at least one HARQ feedback bit in the HARQ feedback. In such an example, the UE may indicate an ACK for the at least one HARQ feedback bit if the UE successfully decodes CBs in a corresponding CBG and a corresponding TBG, and the UE may indicate a NACK for the at least one HARQ feedback bit if the UE does not decode at least one CB in a corresponding CBG and a corresponding TBG. In such an example, as shown at 1110, if the UE indicates a NACK for the at least one HARQ feedback bit, the UE may receive, from the base station, a retransmission for CBs in the corresponding CBG and the corresponding TBG.

In another example, the HARQ feedback may be transmitted via UCI. In such an example, a maximum number of bits for the HARQ feedback in the UCI may correspond to the number of CBGs multiplied by the number of TBGs.

Figure 12:
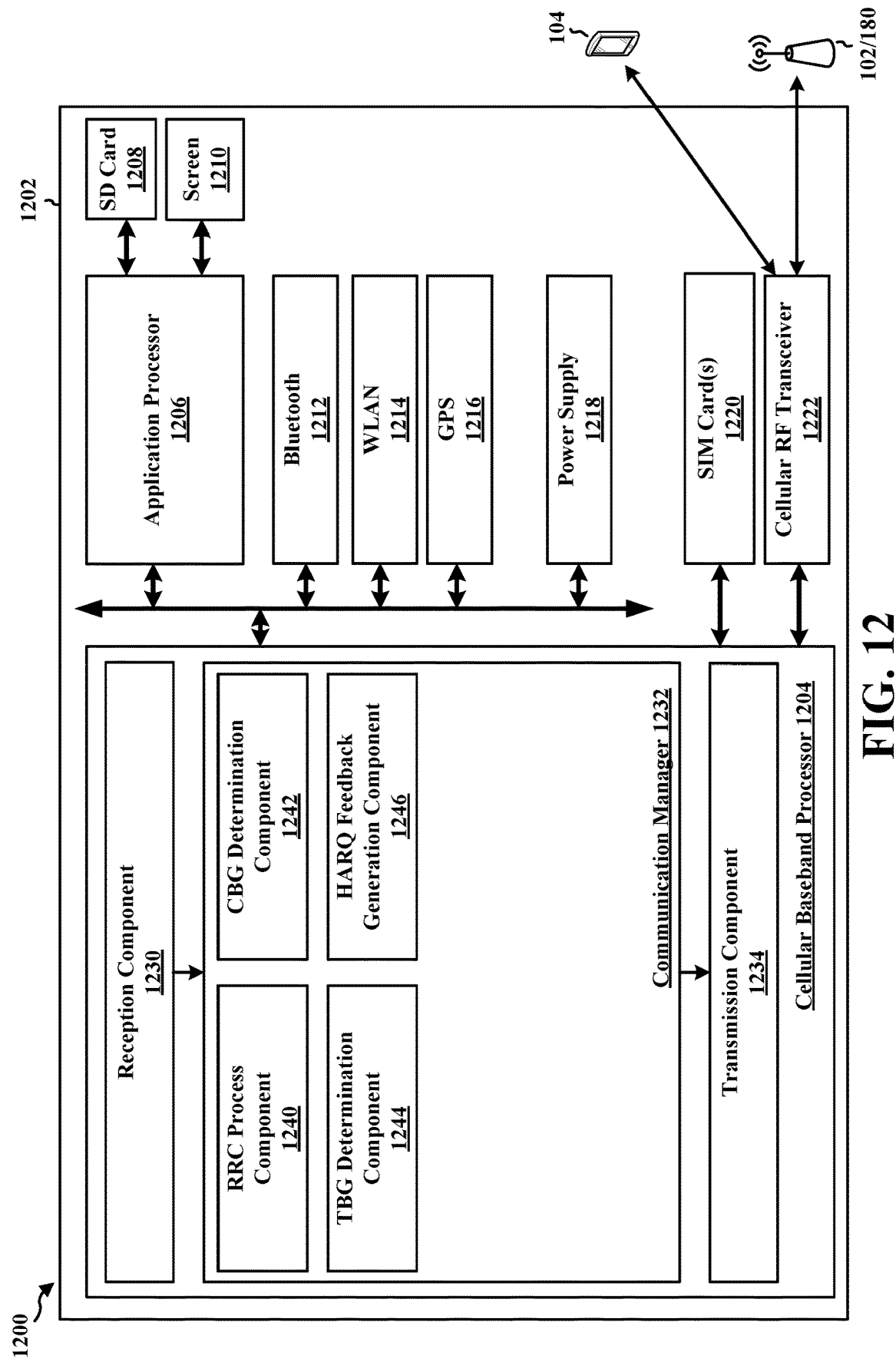
FIG. 12 is a diagram illustrating an example of a hardware implementation for an example apparatus in accordance with aspects presented herein.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes an RRC process component 1240 that is configured to receive an RRC configuration for a HARQ transmission, the RRC configuration including a CBG configuration and a TBG configuration, e.g., as described in connection with 1002 of FIG. 10 and/or 1102 of FIG. 11. The communication manager 1232 further includes a CBG determination component 1242 that is configured to determine, based on the CBG configuration, a number of CBs for each of a plurality of CBGs for HARQ feedback, e.g., as described in connection with 1004 of FIG. 10 and/or 1104 of FIG. 11. The communication manager 1232 further includes a TBG determination component 1244 that is configured to determine, based on the TBG configuration, a number of TBs for each of a plurality of TBGs for the HARQ feedback, e.g., as described in connection with 1006 of FIG. 10 and/or 1106 of FIG. 11. The communication manager 1232 further includes a HARQ feedback generation component 1246 that is configured to transmit, to a base station, the HARQ feedback, the HARQ feedback being based on the number of CBs for each of the plurality of CBGs and the number of TBs for each of the plurality of TBGs, e.g., as described in connection with 1008 of FIG. 10 and/or 1108 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving an RRC configuration for a HARQ transmission, the RRC configuration including a CBG configuration and a TBG configuration (e.g., the RRC process component 1240 and/or the reception component 1230). The apparatus 1202 includes means for determining, based on the CBG configuration, a number of CBs for each of a plurality of CBGs for HARQ feedback (e.g., the CBG determination component 1242). The apparatus 1202 includes means for determining, based on the TBG configuration, a number of TBs for each of a plurality of TBGs for the HARQ feedback (e.g., the TBG determination component 1244). The apparatus 1202 includes means for transmitting, to a base station, the HARQ feedback, the HARQ feedback being based on the number of CBs for each of the plurality of CBGs and the number of TBs for each of the plurality of TBGs (e.g., the HARQ feedback generation component 1246 and/or the transmission component 1234).

In one configuration, the RRC configuration may be preconfigured or received from the base station. In such a configuration, the RRC configuration may include at least one parameter for a maximum number of TBGs per TTI.

In one configuration, the apparatus 1202 includes means for receiving, from the base station, a transmission including a plurality of TBs in a TTI, where each of the plurality of TBs may include a plurality of CBs. In such a configuration, the apparatus 1202 includes means for grouping the plurality of CBs into one or more CBGs based on the determined number of CBs for each of the plurality of CBGs, and means for grouping the plurality of TBs into one or more TBGs based on the determined number of TBs for each of the plurality of TBGs. In such a configuration, the apparatus 1202 includes means for associating each of the one or more CBGs with each of the one or more TBGs with at least one HARQ feedback bit in the HARQ feedback. In such a configuration, the apparatus 1202 includes means for indicating an ACK for the at least one HARQ feedback bit if the UE successfully decodes CBs in a corresponding CBG and a corresponding TBG, and means for indicating a NACK for the at least one HARQ feedback bit if the UE does not decode at least one CB in a corresponding CBG and a corresponding TBG. In such a configuration, if the UE indicates a NACK for the at least one HARQ feedback bit, the apparatus 1202 includes means for receiving, from the base station, a retransmission for CBs in the corresponding CBG and the corresponding TBG.

In another configuration, the HARQ feedback may be transmitted via UCI. In such a configuration, a maximum number of bits for the HARQ feedback in the UCI may correspond to the number of CBGs multiplied by the number of TBGs.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
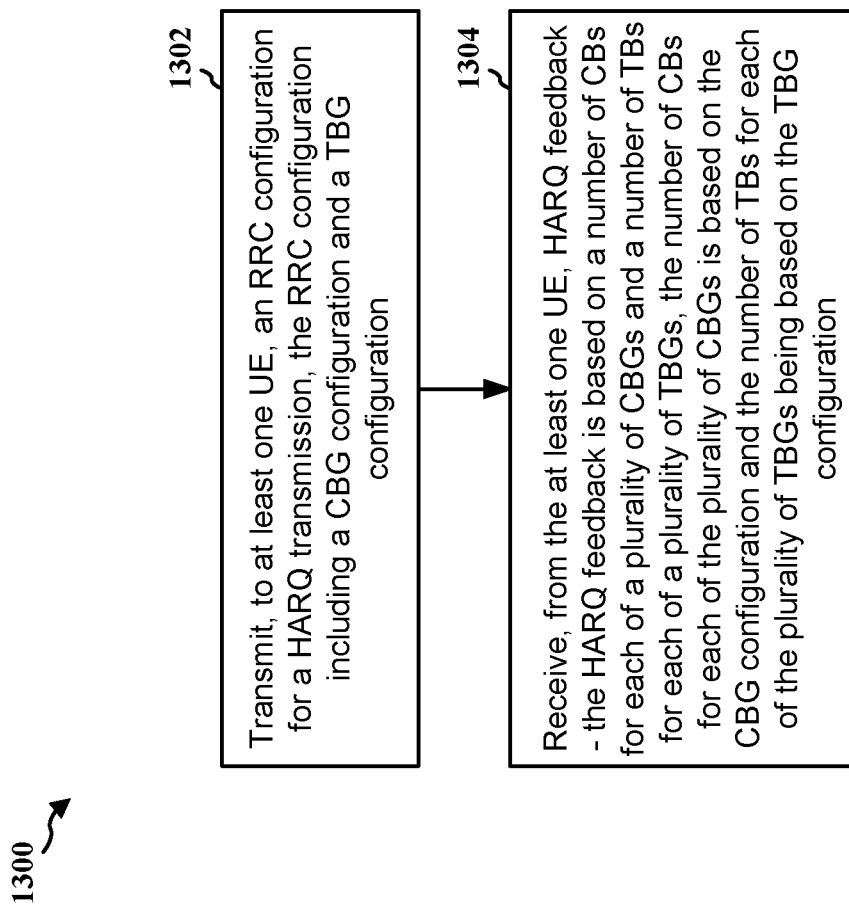
FIG. 13 is a flowchart of a method of wireless communication in accordance with aspects presented herein.

FIG. 13 is a flowchart 1300 of a method of wireless communication. The method may be performed by a base station or a component of a base station (e.g., the base station 102, 180, 310, 602; the apparatus 1502; a processing system, which may include the memory 376 and which may be the entire base station 310 or a component of the base station 310, such as the TX processor 316 the RX processor 370, and/or the controller/processor 375). The method may enable the base station to configure a UE to provide HARQ feedback for multiple groups of CBs based on their associated CBG and the TBG.

At 1302, the base station may transmit, to at least one UE, an RRC configuration for a HARQ transmission, the RRC configuration including a CBG configuration and a TBG configuration, such as described in connection with FIG. 6. For example, at 606, the base station 602 may transmit, to the UE 604, an RRC configuration for a HARQ transmission, where the RRC configuration may include a CBG configuration 608 and a TBG configuration 610. The transmission of the RRC configuration may be performed by, e.g., the RRC configuration component 1540 and/or the transmission component 1534 of the apparatus 1502 in FIG. 15.

At 1304, the base station may receive, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration, such as described in connection with FIG. 6. For example, at 626, the base station 602 may receive the HARQ feedback 614 from the UE 604, where the HARQ feedback 614 may be based on a number of CBs for each of a plurality of CBGs and a number of TBs for each of a plurality of TBGs, and the number of CBs for each of the plurality of CBGs is based on the CBG configuration 608 and the number of TBs for each of the plurality of TBGs is based on the TBG configuration 610. The reception of the HARQ feedback may be performed by, e.g., the HARQ feedback process component 1542 and/or the reception component 1530 of the apparatus 1502 in FIG. 15.

In one example, the HARQ feedback may be received via UCI. In such an example, a maximum number of bits for the HARQ feedback in the UCI may correspond to the number of CBGs multiplied by the number of TBGs.

In another example, the RRC configuration includes at least one parameter for a maximum number of TBGs per TTI.

In another example, the base station may transmit, to the at least one UE, a transmission including a plurality of TBs in a TTI, each of the plurality of TBs including a plurality of CBs. In such an example, the base station may receive, a NACK for one or more CBs that are associated with a CBG and a TBG, the CBG being based on the number of CBs and the TBG being based on the number of TBs. In such an example, the base station may transmit, to the at least one UE, a retransmission for the one or more CBs based on the HARQ feedback. In such an example, the NACK may include at least one HARQ feedback bit.

Figure 14:
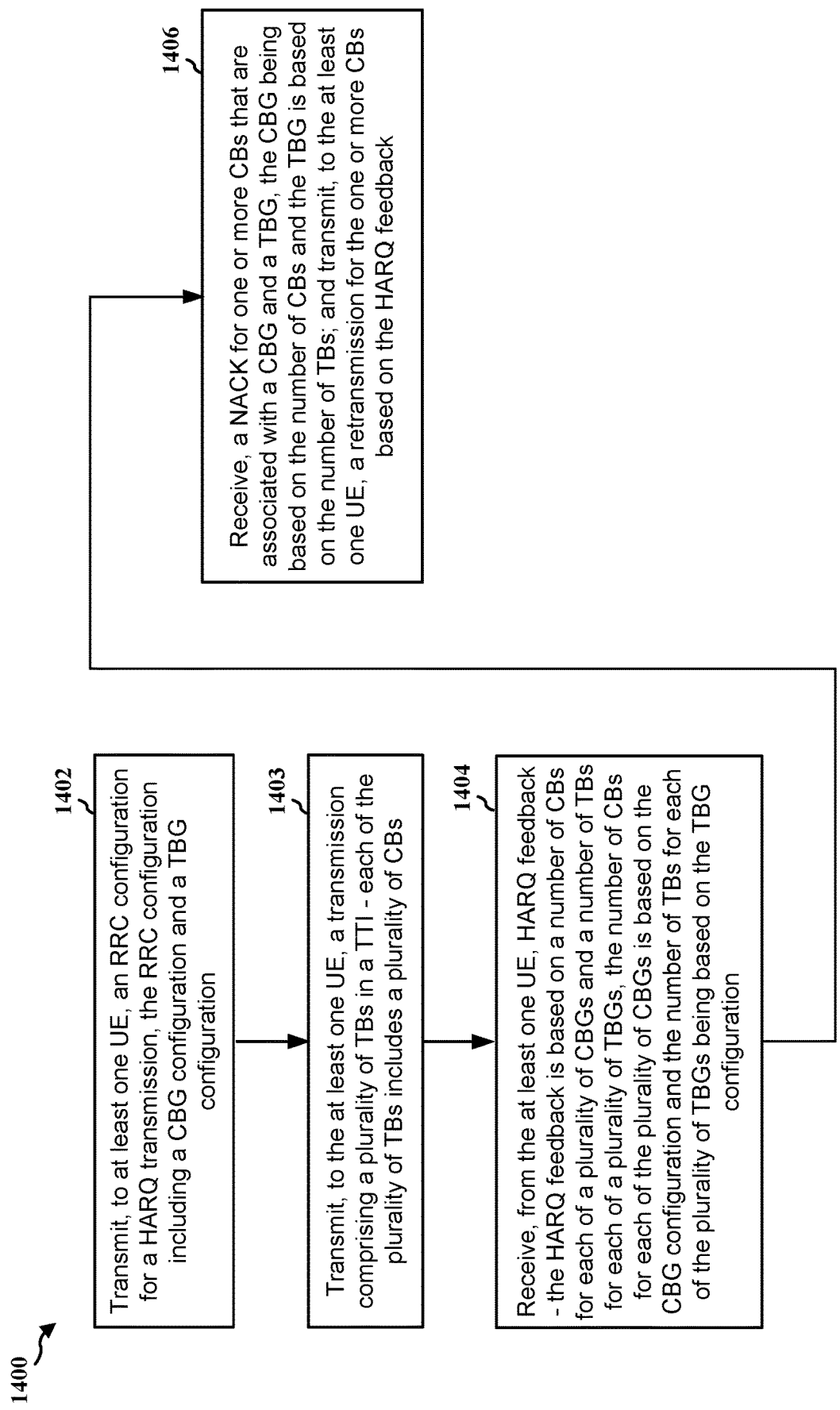
FIG. 14 is a flowchart of a method of wireless communication in accordance with aspects presented herein.

FIG. 14 is a flowchart 1400 of a method of wireless communication. The method may be performed by a base station or a component of a base station (e.g., the base station 102, 180, 310, 602; the apparatus 1502; a processing system, which may include the memory 376 and which may be the entire base station 310 or a component of the base station 310, such as the TX processor 316 the RX processor 370, and/or the controller/processor 375). The method may enable the base station to configure a UE to provide HARQ feedback for multiple groups of CBs based on their associated CBG and the TBG.

At 1402, the base station may transmit, to at least one UE, an RRC configuration for a HARQ transmission, the RRC configuration including a CBG configuration and a TBG configuration, such as described in connection with FIG. 6. For example, at 606, the base station 602 may transmit, to the UE 604, an RRC configuration for a HARQ transmission, where the RRC configuration may include a CBG configuration 608 and a TBG configuration 610. The transmission of the RRC configuration may be performed by, e.g., the RRC configuration component 1540 and/or the transmission component 1534 of the apparatus 1502 in FIG. 15.

At 1404, the base station may receive, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration, such as described in connection with FIG. 6. For example, at 626, the base station 602 may receive the HARQ feedback 614 from the UE 604, where the HARQ feedback 614 may be based on a number of CBs for each of a plurality of CBGs and a number of TBs for each of a plurality of TBGs, and the number of CBs for each of the plurality of CBGs is based on the CBG configuration 608 and the number of TBs for each of the plurality of TBGs is based on the TBG configuration 610. The reception of the HARQ feedback may be performed by, e.g., the HARQ feedback process component 1542 and/or the reception component 1530 of the apparatus 1502 in FIG. 15.

In one example, the HARQ feedback may be received via UCI. In such an example, a maximum number of bits for the HARQ feedback in the UCI may correspond to the number of CBGs multiplied by the number of TBGs.

In another example, the RRC configuration includes at least one parameter for a maximum number of TBGs per TTI.

In another example, as shown at 1403, the base station may transmit, to the at least one UE, a transmission including a plurality of TBs in a TTI, where each of the plurality of TBs may include a plurality of CBs.

In another example, as shown at 1406, the base station may receive, a NACK for one or more CBs that are associated with a CBG and a TBG, where the CBG may be based on the number of CBs and the TBG being based on the number of TBs. In such an example, the base station may transmit, to the at least one UE, a retransmission for the one or more CBs based on the HARQ feedback. In such an example, the NACK may include at least one HARQ feedback bit.

Figure 15:
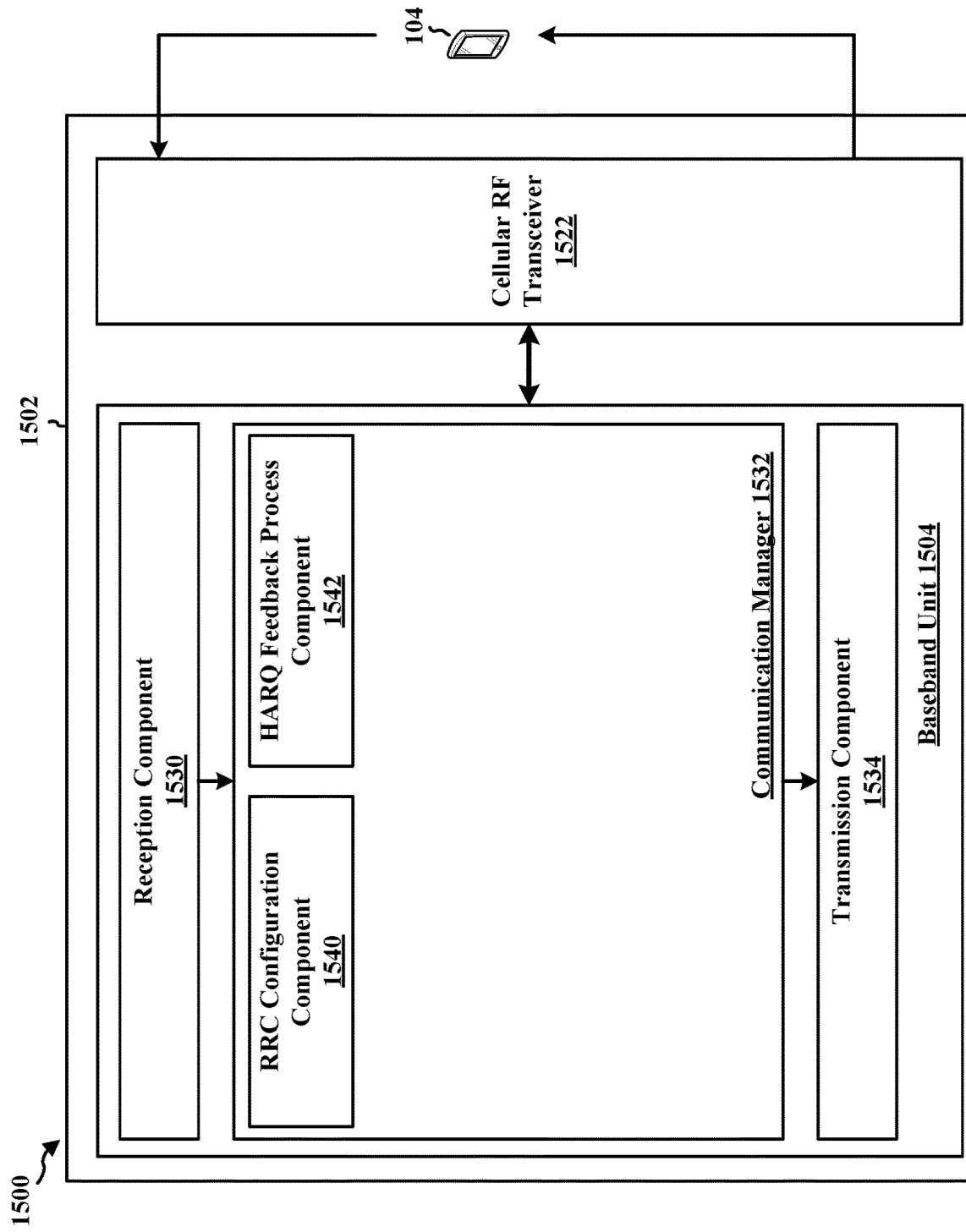
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a base station, a component of a base station, or may implement base station functionality. In some aspects, the apparatus 1002 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes an RRC configuration component 1540 that transmits, to at least one UE, an RRC configuration for a HARQ transmission, the RRC configuration including a CBG configuration and a TBG configuration, e.g., as described in connection with 1302 of FIG. 13 and/or 1402 of FIG. 14. The communication manager 1532 further includes a HARQ feedback process component 1542 that receives, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration, e.g., as described in connection with 1304 of FIG. 13 and/or 1404 of FIG. 14.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to at least one UE, an RRC configuration for a HARQ transmission, the RRC configuration including a CBG configuration and a TBG configuration (e.g., the RRC configuration component 1540 and/or the transmission component 1534). The apparatus 1402 includes means for receiving, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration (e.g., the HARQ feedback process component 1542 and/or the reception component 1530).

In one configuration, the HARQ feedback may be received via UCI. In such a configuration, a maximum number of bits for the HARQ feedback in the UCI may correspond to the number of CBGs multiplied by the number of TBGs.

In another configuration, the RRC configuration may include at least one parameter for a maximum number of TBGs per TTI.

In another configuration, the base station may transmit, to the at least one UE, a transmission including a plurality of TBs in a TTI, each of the plurality of TBs including a plurality of CBs. In such a configuration, the base station may receive, a NACK for one or more CBs that are associated with a CBG and a TBG, the CBG being based on the number of CBs and the TBG being based on the number of TBs. In such a configuration, the base station may transmit, to the at least one UE, a retransmission for the one or more CBs based on the HARQ feedback. In such a configuration, the NACK may include at least one HARQ feedback bit.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive an RRC configuration for a HARQ transmission, the RRC configuration including a CBG configuration and a TBG configuration; determine, based on the CBG configuration, a number of CBs for each of a plurality of CBGs for HARQ feedback; determine, based on the TBG configuration, a number of TBs for each of a plurality of TBGs for the HARQ feedback; and transmit, to a base station, the HARQ feedback, the HARQ feedback being based on the number of CBs for each of the plurality of CBGs and the number of TBs for each of the plurality of TBGs.

Aspect 2 is the apparatus of aspect 1, where the HARQ feedback is transmitted via UCI.

Aspect 3 is the apparatus of any of aspects 1 and 2, where a maximum number of bits for the HARQ feedback in the UCI corresponds to the number of CBGs multiplied by the number of TBGs.

Aspect 4 is the apparatus of any of aspects 1 to 3, where the RRC configuration is preconfigured or received from the base station.

Aspect 5 is the apparatus of any of aspects 1 to 4, where the RRC configuration includes at least one parameter for a maximum number of TBGs per TTI.

Aspect 6 is the apparatus of any of aspects 1 to 5, where the at least one processor is further configured to: receive, from the base station, a transmission including a plurality of TBs in a TTI, each of the plurality of TBs including a plurality of CBs.

Aspect 7 is the apparatus of any of aspects 1 to 6, where the at least one processor is further configured to: group the plurality of CBs into one or more CBGs based on the determined number of CBs for each of the plurality of CBGs; and group the plurality of TBs into one or more TBGs based on the determined number of TBs for each of the plurality of TBGs.

Aspect 8 is the apparatus of any of aspects 1 to 7, where the at least one processor is further configured to: associate each of the one or more CBGs with each of the one or more TBGs with at least one HARQ feedback bit in the HARQ feedback.

Aspect 9 is the apparatus of any of aspects 1 to 8, where the UE indicates an ACK for the at least one HARQ feedback bit if the UE successfully decodes CBs in a corresponding CBG and a corresponding TBG.

Aspect 10 is the apparatus of any of aspects 1 to 9, where the UE indicates a NACK for the at least one HARQ feedback bit if the UE does not decode at least one CB in a corresponding CBG and a corresponding TBG.

Aspect 11 is the apparatus of any of aspects 1 to 10, where the at least one processor is further configured to: receive, from the base station, a retransmission for CBs in the corresponding CBG and the corresponding TBG.

Aspect 12 is the apparatus of any of aspects 1 to 11, further including a transceiver coupled to the at least one processor.

Aspect 13 is a method of wireless communication for implementing any of aspects 1 to 12.

Aspect 14 is an apparatus for wireless communication including means for implementing any of aspects 1 to 12.

Aspect 15 is a computer-readable medium storing computer executable code, where the code when executed by a processor causes the processor to implement any of aspects 1 to 12.

Aspect 16 is an apparatus for wireless communication including at least one processor coupled to a memory and configured to transmit, to at least one UE, an RRC configuration for a HARQ transmission, the RRC configuration including a CBG configuration and a TBG configuration; and receive, from the at least one UE, HARQ feedback, the HARQ feedback being based on a number of CBs for each of a plurality of CBGs and a number of TBs for each of a plurality of TBGs, the number of CBs for each of the plurality of CBGs being based on the CBG configuration and the number of TBs for each of the plurality of TBGs being based on the TBG configuration.

Aspect 17 is the apparatus of aspect 16, where the HARQ feedback is received via UCI.

Aspect 18 is the apparatus of any of aspects 16 and 17, where a maximum number of bits for the HARQ feedback in the UCI corresponds to the number of CBGs multiplied by the number of TBGs.

Aspect 19 is the apparatus of any of aspects 16 to 18, where the RRC configuration includes at least one parameter for a maximum number of TBGs per TTI.

Aspect 20 is the apparatus of any of aspects 16 to 19, where the at least one processor is further configured to: transmit, to the at least one UE, a transmission including a plurality of TBs in a TTI, each of the plurality of TBs including a plurality of CBs.

Aspect 21 is the apparatus of any of aspects 16 to 20, where the at least one processor is further configured to: receive, a NACK for one or more CBs that are associated with a CBG and a TBG, the CBG being based on the number of CBs and the TBG being based on the number of TBs; and transmit, to the at least one UE, a retransmission for the one or more CBs based on the HARQ feedback.

Aspect 22 is the apparatus of any of aspects 16 to 21, where the NACK includes at least one HARQ feedback bit.

Aspect 23 is the apparatus of any of aspects 16 to 22, further including a transceiver coupled to the at least one processor.

Aspect 24 is a method of wireless communication for implementing any of aspects 16 to 23.

Aspect 25 is an apparatus for wireless communication including means for implementing any of aspects 16 to 23.

Aspect 26 is a computer-readable medium storing computer executable code, where the code when executed by a processor causes the processor to implement any of aspects 16 to 23.

What is claimed is:

1. An apparatus for wireless communication at a user equipment (UE), comprising:
   memory; and
   at least one processor coupled to the memory and configured to:
   receive a radio resource control (RRC) configuration for a hybrid automatic repeat request (HARQ) transmission, the RRC configuration including a code block group (CBG) configuration and a transport block group (TBG) configuration;
determine, based on the CBG configuration, a number of code blocks (CBs) for each of a plurality of CBGs for HARQ feedback;
determine, based on the TBG configuration, a number of transport blocks (TBs) for each of a plurality of TBGs for the HARQ feedback, wherein at least one TBG in the plurality of TBGs includes multiple TBs;
receive, from a base station, a transmission comprising a plurality of TBs in a transmission time interval (TTI), each of the plurality of TBs comprising a plurality of CBs;
group the plurality of CBs into one or more CBGs based on the determined number of CBs for each of the plurality of CBGs;
group the plurality of TBs into one or more TBGs based on the determined number of TBs for each of the plurality of TBGs;
associate each of the one or more CBGs with each of the one or more TBGs with at least one HARQ feedback bit in the HARQ feedback;
transmit, to the base station, the HARQ feedback, the HARQ feedback being based on the number of CBs for each of the plurality of CBGs and the number of TBs for each of the plurality of TBGs, wherein the at least one processor is configured to indicate an acknowledgement (ACK) for the at least one HARQ feedback bit in the HARQ feedback if CBs in a corresponding CBG and a corresponding TBG are successfully decoded, or indicate a negative acknowledgement (NACK) for the at least one HARQ feedback bit in the HARQ feedback if at least one CB in the corresponding CBG and the corresponding TBG is not decoded; and
receive, from the base station, a retransmission for CBs in the corresponding CBG and the corresponding TBG.

2. The apparatus of claim 1, wherein to transmit the HARQ feedback, the at least one processor is configured to transmit the HARQ feedback via uplink control information (UCI).

3. The apparatus of claim 2, wherein a maximum number of bits for the HARQ feedback in the UCI corresponds to the number of CBGs multiplied by the number of TBGs.

4. The apparatus of claim 1, wherein the RRC configuration is preconfigured or received from the base station.

5. The apparatus of claim 1, wherein the RRC configuration includes at least one parameter for a maximum number of TBGs per TTI.

6. The apparatus of claim 1, wherein the at least one processor is configured to indicate the ACK for the at least one HARQ feedback bit based on the CBs in the corresponding CBG and the corresponding TBG being successfully decoded.

7. The apparatus of claim 1, wherein the at least one processor is configured to indicate the NACK for the at least one HARQ feedback bit based on the at least one CB in a corresponding CBG and a corresponding TBG not being successfully decoded.

8. The apparatus of claim 1, further comprising a transceiver coupled to the at least one processor.

9. A method of wireless communication at a user equipment (UE), comprising, comprising:
receiving a radio resource control (RRC) configuration for a hybrid automatic repeat request (HARQ) transmission, the RRC configuration including a code block group (CBG) configuration and a transport block group (TBG) configuration;
determining, based on the CBG configuration, a number of code blocks (CBs) for each of a plurality of CBGs for HARQ feedback;
determining, based on the TBG configuration, a number of transport blocks (TBs) for each of a plurality of TBGs for the HARQ feedback, wherein at least one TBG in the plurality of TBGs includes multiple TBs;
receiving, from a base station, a transmission comprising a plurality of TBs in a transmission time interval (TTI), each of the plurality of TBs comprising a plurality of CBs;
grouping the plurality of CBs into one or more CBGs based on the determined number of CBs for each of the plurality of CBGs;
grouping the plurality of TBs into one or more TBGs based on the determined number of TBs for each of the plurality of TBGs;
associating each of the one or more CBGs with each of the one or more TBGs with at least one HARQ feedback bit in the HARQ feedback;
transmitting, to the base station, the HARQ feedback, the HARQ feedback being based on the number of CBs for each of the plurality of CBGs and the number of TBs for each of the plurality of TBGs, the UE indicates an acknowledgement (ACK) for the at least one HARQ feedback bit if the UE successfully decodes CBs in a corresponding CBG and a corresponding TBG, or indicates a negative acknowledgement (NACK) for the at least one HARQ feedback bit if the UE does not decode at least one CB in the corresponding CBG and the corresponding TBG; and
receiving, from the base station, a retransmission for CBs in the corresponding CBG and the corresponding TBG.

10. The method of claim 9, wherein the HARQ feedback is transmitted via uplink control information (UCI).

11. The method of claim 10, wherein a maximum number of bits for the HARQ feedback in the UCI corresponds to the number of CBGs multiplied by the number of TBGs.

12. The method of claim 9, wherein the RRC configuration is preconfigured or received from the base station.

13. The method of claim 9, wherein the RRC configuration includes at least one parameter for a maximum number of TBGs per TTI.

14. The method of claim 9, wherein the UE indicates the ACK for the at least one HARQ feedback bit based on the CBs in the corresponding CBG and he corresponding TBG being successfully decoded.

15. The method of claim 9, wherein the UE indicates the NACK for the at least one HARQ feedback bit based on the at least one CB in the corresponding CBG and the corresponding TBG not being successfully decoded.

* * * * *